(12) United States Patent
Jen-Hsiang

(10) Patent No.: US 6,338,464 B1
(45) Date of Patent: Jan. 15, 2002

(54) BASE ASSEMBLY OF INDIFFERENT EQUILIBRIUM

(75) Inventor: Lee Jen-Hsiang, Taipei (TW)

(73) Assignee: Mitac Technology Corp., Hsinchu (TW)

( * ) Notice: Subject to any disclaimer, the term of this patent is extended or adjusted under 35 U.S.C. 154(b) by 0 days.

(21) Appl. No.: 09/375,682

(22) Filed: Aug. 17, 1999

(30) Foreign Application Priority Data

Aug. 20, 1998 (TW) .......................................... 87113746

(51) Int. Cl.⁷ ............................................... A47B 91/00
(52) U.S. Cl. .................... 248/348.1; 219/755; 248/131; 248/415; 248/417; 248/919
(58) Field of Search ................................. 248/587, 590, 248/597, 625, 623, 183.3, 188.3, 371, 346.01, 917, 918, 372.1, 415, 349.1, 131; 108/139, 20; 219/755

(56) References Cited

U.S. PATENT DOCUMENTS

| | | | | |
|---|---|---|---|---|
| 2,757,712 A | * | 8/1956 | Johnson ....................... 248/183 |
| 4,254,319 A | * | 3/1981 | Beh et al. ................. 219/10.55 |
| 4,542,872 A | * | 9/1985 | Marino et al. .............. 248/183 |
| 4,570,892 A | * | 2/1986 | Czech et al. ............. 248/372.1 |
| 4,621,782 A | * | 11/1986 | Carlson et al. ............. 248/183 |
| 4,694,132 A | * | 9/1987 | Liu .......................... 219/10.55 |
| 4,831,306 A | * | 5/1989 | Staufenberg, Jr. et al. .. 310/328 |
| 4,834,329 A | * | 5/1989 | Delapp ................... 248/371 X |
| 5,518,216 A | | 5/1996 | Wu |
| 6,095,475 A | * | 8/2000 | Willms et al. .............. 248/421 |
| 6,231,020 B1 | * | 5/2001 | Willson .................... 248/349.1 |

* cited by examiner

Primary Examiner—Ramon O. Ramirez
Assistant Examiner—Tan Le
(74) Attorney, Agent, or Firm—Darby & Darby

(57) ABSTRACT

A base assembly of indifferent equilibrium. The base assembly includes a stationary member, a rotatable member and a constant-force spring. The rotatable member is rotatably mounted on the stationary member. The constant-force spring member has an end portion connected to the rotatable member and a coiled portion connected to the stationary member, wherein a restoring force of the constant-force spring member is equal to a frictional force between the stationary member and the rotatable member.

31 Claims, 5 Drawing Sheets

BASE ASSEMBLY OF INDIFFERENT EQUILIBRIUM

BACKGROUND OF THE INVENTION

1. Field of the Invention

The present invention relates in general to a base assembly of indifferent equilibrium having a reduced number of parts.

2. Description of the Related Art

When using a personal computer, the user adjusts the orientation of the display so that he feels comfortable viewing the display. The orientation of the display should be maintained once the user feels comfortable. Thus, the base of the display is carefully designed so that the display is in indifferent equilibrium at all times.

A typical example of a base assembly is disclosed in U.S. Pat. No. 5,518,216. However, this base assembly requires too many parts, thus necessitating the stocking of a large quantity of parts and raising the cost of manufacture. Therefore, a base assembly requiring a reduced number of parts is needed.

SUMMARY OF THE INVENTION

An object of the present invention is to provide a base assembly which is in indifferent equilibrium during operation.

Another object of the present invention is to provide a base assembly requiring a reduced number of parts so that the cost of manufacture and storage of parts can be greatly reduced.

The base assembly of the present invention includes a stationary member, a rotatable member and a constant-force spring. The rotatable member is rotatably mounted on the stationary member. The constant-force spring member has an end portion connected to the rotatable member and a coiled portion connected to the stationary member, wherein a restoring force of the constant-force spring member is equal to a frictional force between the stationary member and the rotatable member.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1A:
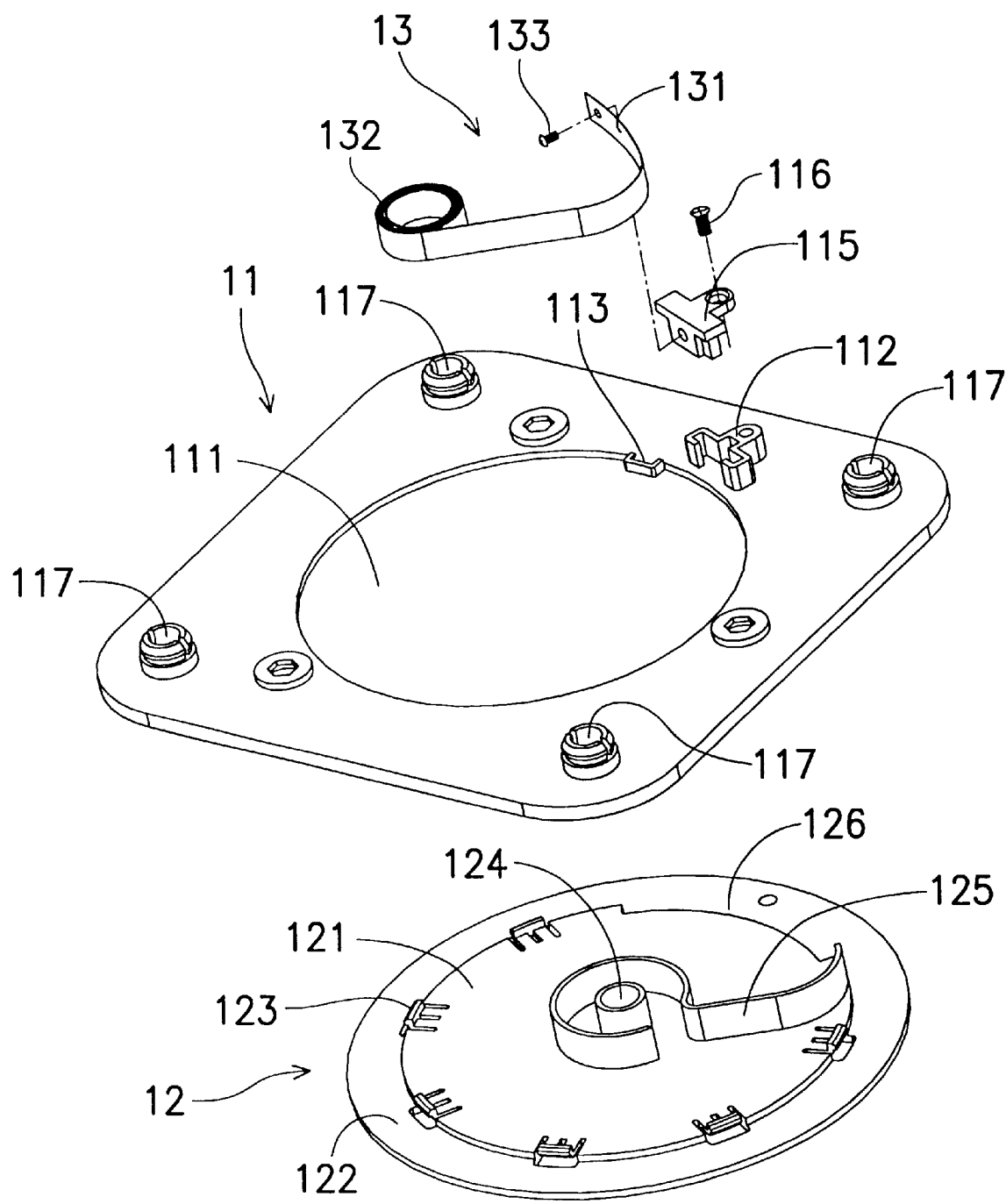
FIGS. 1A and 1B are exploded perspective diagrams of a base assembly in accordance with the present invention, observed from different directions.
Figure 1B:
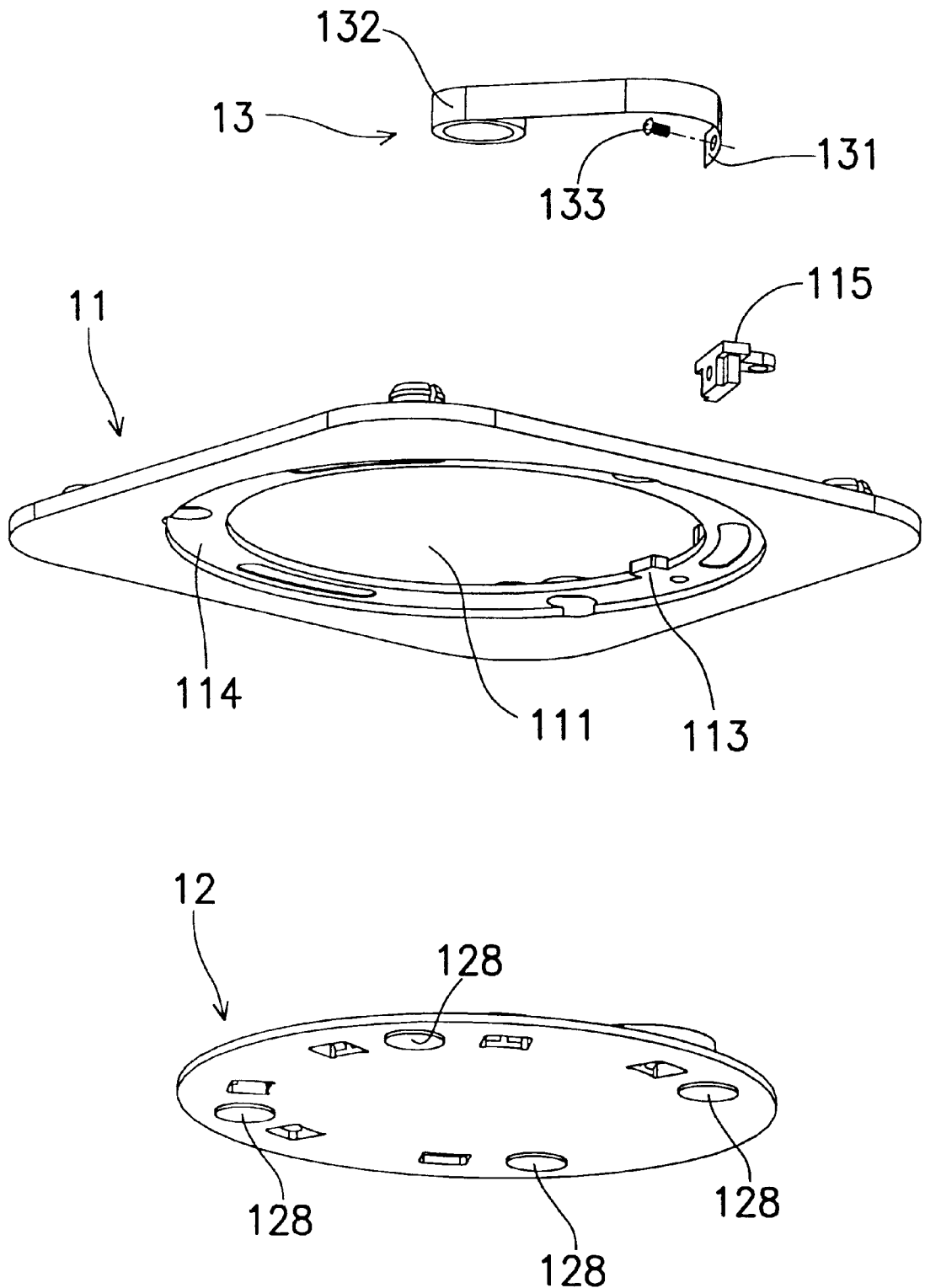

In the present invention, a rotation mechanism is adapted for a base assembly of indifferent equilibrium. For example, the display of a personal computer is rotated with respect to a base via a rotation mechanism. Referring to FIGS. 1A and 1B, the base assembly of indifferent equilibrium of the present invention includes a rotatable member 11, a stationary member 12 and a constant-force spring 13.

The rotatable member 11 is connected to a rotatable object such as a display of a personal computer via four connecting posts 117. A round opening 111 is formed on the rotatable member 11. A protruding portion 113 protrudes from the opening 111 in the rotatable member 11. A mount 112 is connected onto the rotatable member 11 for receiving a fixing block 115. On the opposite surface of the rotatable member 11 is formed a recess 114 at the circumference of the opening 111.

The stationary member 12 includes a round top body 121 and a round bottom body 122. A post 124 is connected to the top body 121, while a wall 125 is wound on the top body 121. Furthermore, an arcuate notch 126 and a plurality of engaging portions 123 are provided at the rims of the top body 121. A plurality of pads 128 with large frictional coefficients are attached to the bottom member 12.

Figure 2:
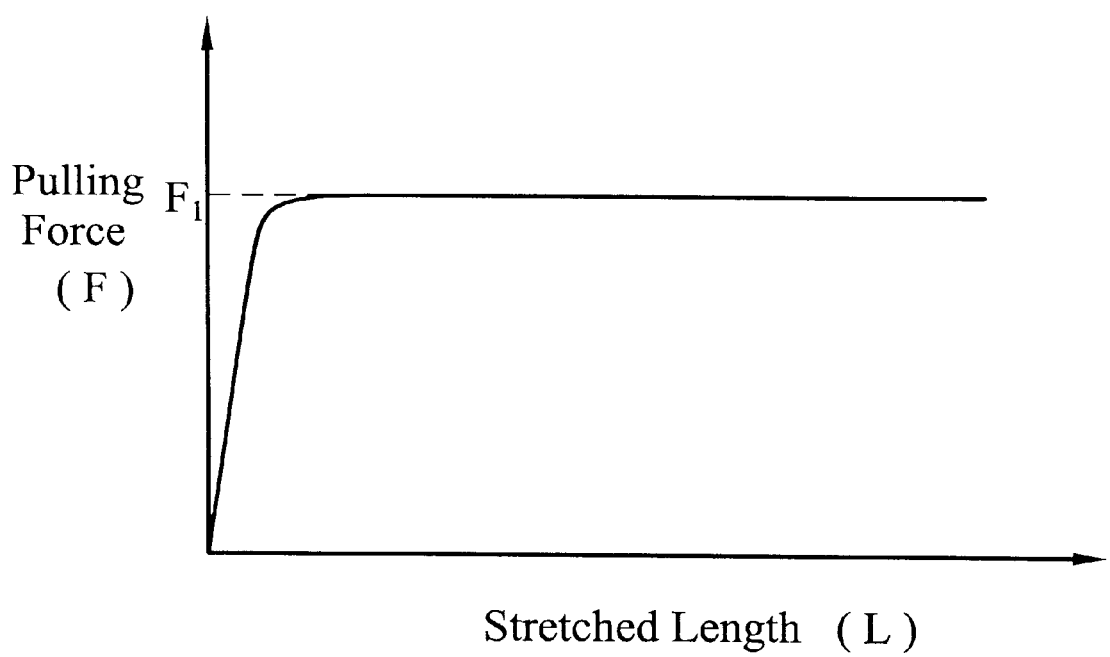
FIG. 2 shows a force-length curve of a constant-force spring.

The constant-force spring 13 has a coiled portion 132 and an end portion 131 to which an external pulling force is applied. FIG. 2 shows a force-length curve of the constant-force spring, wherein the pulling force (F) is an external force applied to the end portion 131 of the spring 13. It is noted that the stretched length (L) of the spring is not a length deformation. Instead, the stretched length is a total length of the spring under the pulling force. It is understood from FIG. 2 that the stretched length can be arbitrarily changed within a limited range when the pulling force is $F_1$. That is, the restoring force of the spring is equal to the external pulling force $F_1$ regardless of the stretched length of the spring. This feature of the constant-force spring is used in the present invention. The frictional force between the rotatable member 11 and the stationary member 12 is set at $F_1$, which is always equal to the restoring force of the spring.

How to assemble the base assembly of indifferent equilibrium is now described. The top body 121 of the stationary member 12 is fitted into the opening 111 of the rotatable member 11 so that the engaging portions 123 of the stationary member 12 engage the rotatable member 11 on the periphery of the opening 111. The rims of the bottom body 122 are received in the recess 114 of the rotatable member 11 and the protruding portion 113 is received in the notch 126 of the stationary member 12. Then, the fixing block 115 is fixed to the mount 112 by a screw 116. The end portion 131 of the constant-force spring 13 is fixed to the fixing block 115 by a screw 116 and the coiled portion 132 is put around the post 124 of the stationary member 12 and the stretched portion of the constant-force spring 13 rests against the wall 125.

Figure 3:
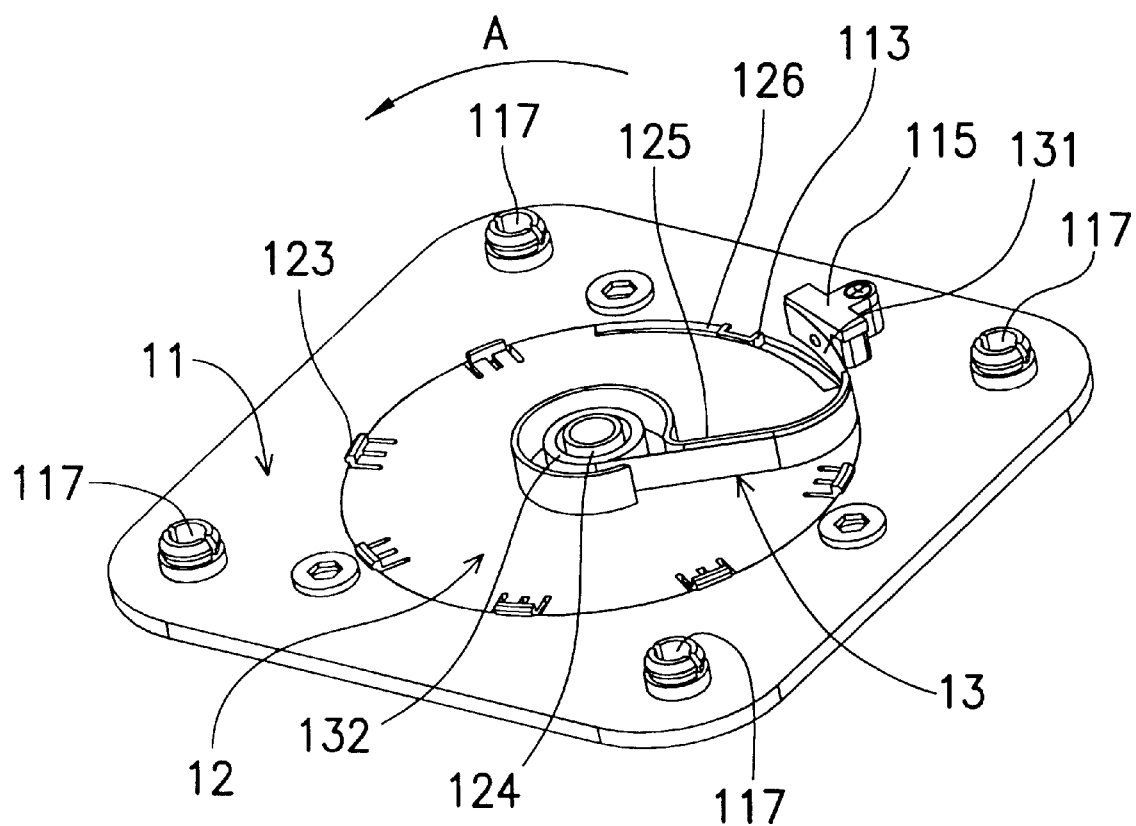
FIG. 3 is an assembly diagram of the base assembly in accordance with the present invention.

An application of the base assembly of the present invention is now described. A display of a personal computer (not shown) is firmly connected to the rotatable member 11 via the connecting posts 117. Then, the display together with the base assembly are disposed on a desk with the pads 128 of the base assembly in contact with the desk surface. The frictional coefficients of the pads 128 are great enough to prevent the stationary member 12 from moving. Referring to FIG. 3, if the user rotates the display in a direction as indicated by arrow A, then the display forces in sequence the rotatable member 11, the fixing block 115 and the end portion 131 of the spring 13 to rotate with respect to the stationary member 12 so that the spring 13 is stretched out. Meanwhile, the protruding portion 113 of the rotatable member 11 moves in the notch 126 of the stationary member 12. Therefore, the notch 126 limits the rotation range of the display firmly connected to the rotatable member 11. If at any time the user releases the display, the restoring force of the constant-force spring 13 is equal to the frictional force between the rotatable member 11 and the stationary member 12, the orientation of the display is maintained. As designed, the display is always in indifferent equilibrium within the range of rotation.

In the present invention, the base assembly only includes three main parts. The cost of manufacture and storage of parts can be greatly reduced.

Figure 4:
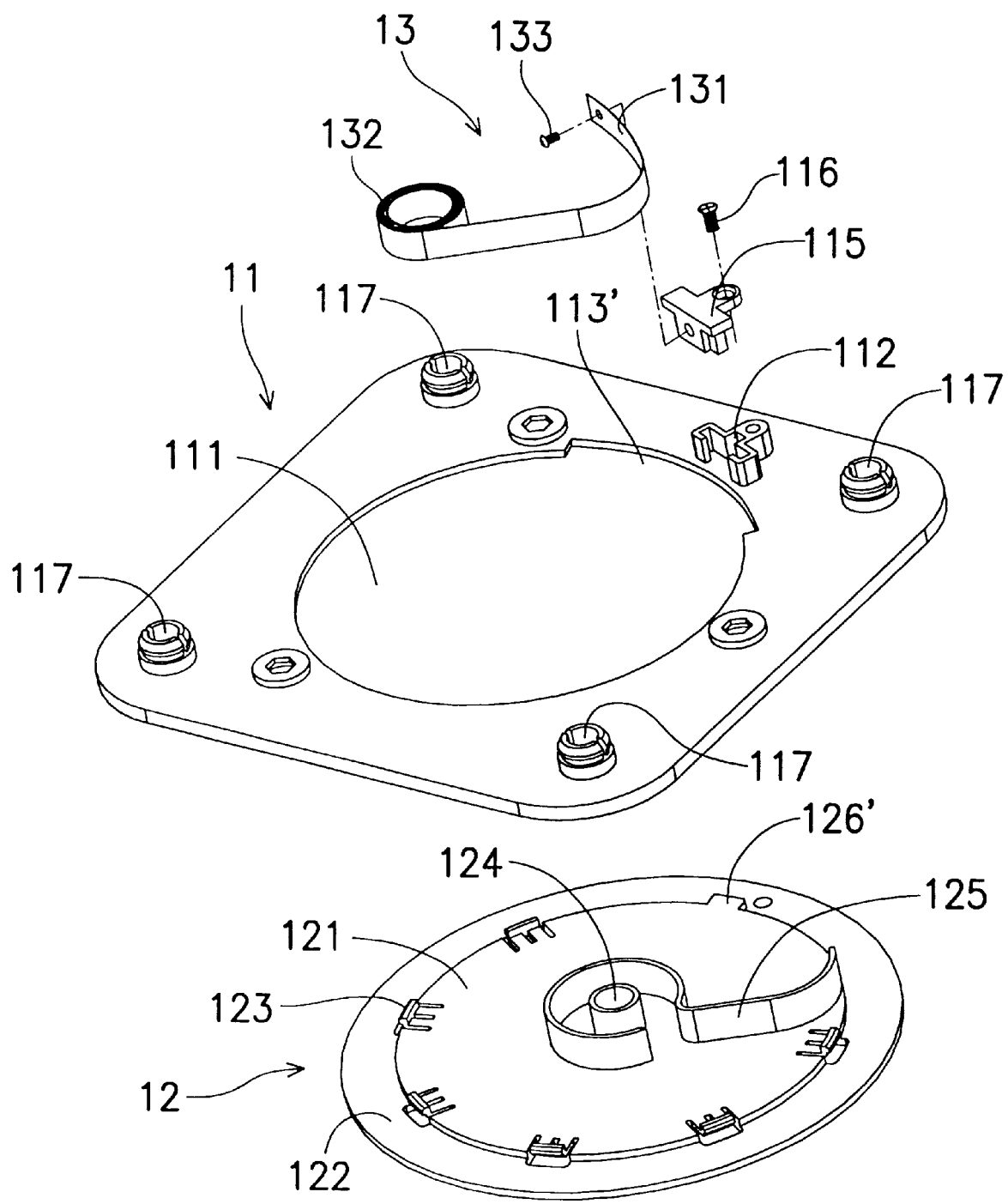
FIG. 4 depicts a modified base assembly of the present invention.

The embodiment mentioned above can be modified. For example, the arrangements of the protruding portion 113 and notch 126 can be exchanged. As shown in FIG. 4, on the periphery of the opening 111 of the rotatable member 11 is provided a notch 113' which communicates the opening 111. Also, at the rims of the top body 121 of the stationary member 12 is provided a protruding portion 126'. Then, after being assembled, the protruding portion 126' of the stationary member 12 moves in the notch 113' of the rotatable member 11. The notch 126 limits the rotation range of the display firmly connected to the rotatable member 11.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A base assembly of indifferent equilibrium, comprising:
   a stationary member;
   a rotatable member rotatably mounted on the stationary member;
   a constant-force spring member having an end portion connected to the stationary member, wherein a restoring force of the constant-force spring member is equal to a frictional force between the stationary member and the rotatable member regardless of amount of rotation of the rotatable member and
   wherein the rotatable member has an opening and a recess formed around the opening, and the stationary member has a first body received in the opening and a second body received in the recess.

2. A base assembly of indifferent equilibrium as claimed in claim 1, wherein the stationary member has a post and the coiled portion of the constant-force spring member is put around the post.

3. A base assembly of indifferent equilibrium as claimed in claim 1, wherein the stationary member has a wall on which the constant-force spring member rests against.

4. A base assembly of indifferent equilibrium as claimed in claim 1, wherein the rotatable member has a fixing block to which the end portion of the constant-force spring member is connected.

5. A base assembly of indifferent equilibrium as claimed in claim 4, wherein the rotatable member further has a mount in which the fixing block is received.

6. A base assembly of indifferent equilibrium as claimed in claim 1, wherein the rotatable member has at least one connecting portion to connect the base assembly and an object.

7. A base assembly of indifferent equilibrium as claimed in claim 1, wherein the stationary member has at least one pad via which the base assembly is supported by an object, and a frictional force between the pad and the object is great enough to prevent the stationary member from sliding on the object when the rotatable member is rotated with respect to the stationary member.

8. A base assembly of indifferent equilibrium, comprising:
   a stationary member adapted to rest on a horizontal support;
   a rotatable member rotatably mounted about a vertical axis on the stationary member; and
   a constant-force spring member having an end portion connected to the stationary member, wherein a restoring force of the constant-force spring member is equal to a frictional force between the stationary member and the rotatable member regardless of the amount of rotation of the rotatable member constant-force spring member;
   wherein the rotatable member has an opening in a horizontal plane and a recess formed around the opening, and the stationary member has a first body projections in a vertical direction and received in the opening, and a second body received in the recess.

9. The base assembly of claim 8 wherein the first body of the stationary member has a plurality of engaging portions to engage the rotatable member.

10. The base assembly of claim 8 wherein the first body of the stationary member has a notch, the rotatable member further has a protruding portion formed in the opening, and the protruding portion moves in the notch when the rotatable member is rotated with respect to the stationary member.

11. The base assembly of claim 8 wherein the first body of the stationary member has a protruding portion, the rotatable member further has a notch communicating with the opening, and the protruding portion moves in the notch when the rotatable member is rotated with respect to the stationary member.

12. A base assembly of indifferent equilibrium, comprising:
    a stationary member;
    a rotatable member rotatably mounted on the stationary member; and
    a constant-force spring member having an end portion connected to the stationary member, wherein a restoring force of the constant-force spring member is equal to a frictional force between the stationary member and the rotatable member;
    wherein the rotatable member has an opening and a recess formed around the opening, and the stationary member has a first body received in the opening and a second body received in the recess;
    wherein the rotatable member further has a protruding portion formed in the opening.

13. The base assembly of claim 12 wherein the first body of the stationary member has a plurality of engaging portions to engage the rotatable member.

14. The base assembly of claim 12 wherein the first body of the stationary member has a notch and the protruding portion moves in the notch when the rotatable member is rotated with respect to the stationary member.

15. The base assembly of claim 12 wherein the rotatable member further has a notch communicating with the opening, and the protruding portion moves in the notch when the rotatable member is rotated with respect to the stationary member.

16. The base assembly of claim 12 wherein the stationary member has a post and the coiled portion of the constant-force spring member is put around the post.

17. The base assembly of claim 12 wherein the stationary member has a wall on which the constant-force spring member rests against.

18. The base assembly of claim 12 wherein the rotatable member has a fixing block to which the end portion of the constant-force spring member is connected.

19. The base assembly of claim 18 wherein the rotatable member further has a mount in which the fixing block is received.

20. The base assembly of claim 12 wherein the rotatable member has at least one connecting portion to connect the base assembly and an object.

21. The base assembly of claim 12 wherein the stationary member has at least one pad via which the base assembly is supported by an object, and a frictional force between the pad and the object is great enough to prevent the stationary member from sliding on the object when the rotatable member is rotated with respect to the stationary member.

22. A method for a base assembly of indifferent equilibrium, comprising the steps of:

providing a stationary member;

mounting a rotatable member rotatably on the stationary member; and providing a constant-force spring member having an end portion connected to the stationary member, wherein a restoring force of the constant-force spring member is equal to a frictional force between the stationary member and the rotatable member;

forming an opening in the rotatable member and a recess around the opening wherein the stationary member has a first body received in the opening and a second body received in the recess; and forming a protruding portion in the opening of the rotatable member.

23. The method of claim 22 further comprising the step of engaging the rotatable member with a plurality of engaging portions of the first body of the stationary member.

24. The method of claim 22 wherein the first body of the stationary member has a notch and the protruding portion moves in the notch when the rotatable member is rotated with respect to the stationary member.

25. The method of claim 22 wherein the rotatable member further has a notch communicating with the opening, and the protruding portion moves in the notch when the rotatable member is rotated with respect to the stationary member.

26. The method of claim 22 wherein the stationary member has a post and the coiled portion of the constant-force spring member is located around the post.

27. The method of claim 22 wherein the stationary member has a wall on which the constant-force spring member rests against.

28. The method of claim 22 further comprising the step of connecting a fixing block of the rotatable member with the end portion of the constant-force spring member.

29. The method of claim 28 further comprising the step of receiving the fixing block in a mount of the rotatable member.

30. The method of claim 22 further comprising the step of connecting the base assembly and an object with at least one connecting portion of the rotatable member.

31. The method of claim 22 further comprising the step of supporting the base assembly with an object using at least one pad of the stationary member wherein a frictional force between the pad and the object is great enough to prevent the stationary member from sliding on the object when the rotatable member is rotated with respect to the stationary member.

* * * * *

UNITED STATES PATENT AND TRADEMARK OFFICE
CERTIFICATE OF CORRECTION

PATENT NO.      : 6,338,464 B1
DATED           : January 15, 2002
INVENTOR(S)     : Jen-Hsiang Lee It is certified that error appears in the above-identified patent and that said Letters Patent is hereby corrected as shown below:

<u>Title page,</u>
Item [75], Inventor, delete "Lee Jen-Hsiang" and substitute -- Jen-Hsiang Lee --.

Signed and Sealed this

Twenty-eighth Day of October, 2003

JAMES E. ROGAN
*Director of the United States Patent and Trademark Office*